(12) United States Patent
Johnson et al.

(10) Patent No.: US 11,457,610 B1
(45) Date of Patent: Oct. 4, 2022

(54) ANIMAL TRAINING DEVICE

(71) Applicants: Matthew Timothy Johnson, Ravensdale, WA (US); Erik Ross Haugaard, Seattle, WA (US)

(72) Inventors: Matthew Timothy Johnson, Ravensdale, WA (US); Erik Ross Haugaard, Seattle, WA (US)

( * ) Notice: Subject to any disclaimer, the term of this patent is extended or adjusted under 35 U.S.C. 154(b) by 44 days.

(21) Appl. No.: 17/096,809

(22) Filed: Nov. 12, 2020

Related U.S. Application Data

(60) Provisional application No. 62/934,157, filed on Nov. 12, 2019.

(51) Int. Cl.
*A01K 5/00* (2006.01)
*A01K 15/02* (2006.01)
*G10K 3/00* (2006.01)

(52) U.S. Cl.
CPC ............... *A01K 15/02* (2013.01); *G10K 3/00* (2013.01)

(58) Field of Classification Search
CPC .... A01K 15/02; A01K 15/026; A01K 15/025; A01K 5/0114; B05C 17/0123; B05C 17/00576; B05C 17/01; B65D 83/0033; B65D 83/0038; B65D 83/005
See application file for complete search history.

(56) References Cited

U.S. PATENT DOCUMENTS

| | | | | |
|---|---|---|---|---|
| 6,722,317 B2* | 4/2004 | O'Rourke | ............ | A01K 5/0114 119/51.01 |
| 6,953,007 B1* | 10/2005 | Cummings | ............ | A01K 15/02 119/51.01 |
| 9,801,354 B2* | 10/2017 | Zimmermann | ...... | A01K 15/026 |
| 2005/0183674 A1* | 8/2005 | Zutis | .................... | A01K 15/025 119/719 |
| 2005/0263098 A1* | 12/2005 | Olson | ................... | A01K 5/0114 119/51.01 |
| 2006/0000416 A1* | 1/2006 | Zutis | .................... | A01K 5/0114 119/51.01 |
| 2007/0056517 A1* | 3/2007 | Caveza | ................ | A01K 15/026 119/51.01 |
| 2007/0074668 A1* | 4/2007 | Zutis | .................... | A01K 5/0114 119/51.01 |
| 2007/0095293 A1* | 5/2007 | Moulton | ............. | A01K 5/0114 119/51.01 |

(Continued)

FOREIGN PATENT DOCUMENTS

DE 102018104269 A1 * 8/2019

*Primary Examiner* — Trinh T Nguyen
(74) *Attorney, Agent, or Firm* — Plager Schack LLP; Mark H. Plager; Michael J. O'Brien

(57) ABSTRACT

An animal training device is configured to encourage an animal with a clicking sound and a gelatinous reward. The animal training device has a housing, joined to a housing end cap at a housing first end and a dispenser head at a housing second end. A dowel rod is arranged within the housing and through a dispensing lever. A push bar is arranged within the housing and joined to the dispensing lever with a drive plate and a first compressor spring; wherein the push bar further comprises a push bar first end and a push bar second end. A tube is fit over the end cap and accommodates the gelatinous reward. Depressing the dispensing lever moves the drive plate and thus the push bar, pushing the gelatinous reward through the dispenser head.

4 Claims, 4 Drawing Sheets

(56) References Cited

U.S. PATENT DOCUMENTS

| | | | |
|---|---|---|---|
| 2012/0067290 A1* | 3/2012 | Mainini | A01K 15/02 119/72 |
| 2013/0233246 A1* | 9/2013 | Wang | A01K 15/025 119/51.01 |
| 2014/0048017 A1* | 2/2014 | Mainini | A01K 5/0114 119/51.01 |

* cited by examiner

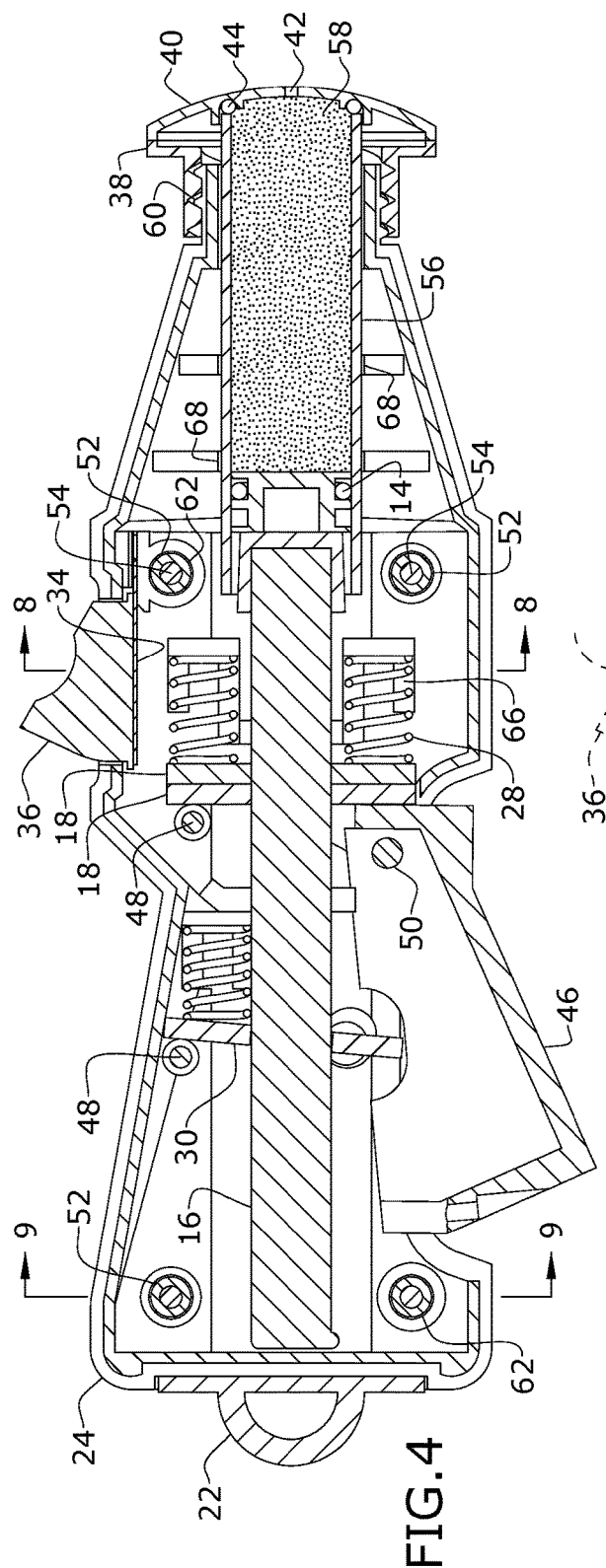

ANIMAL TRAINING DEVICE

RELATED APPLICATION

This application claims priority to provisional patent application U.S. Ser. No. 62/934,157 filed on Nov. 12, 2019, the entire contents of which is herein incorporated by reference.

BACKGROUND

The embodiments herein relate generally to animal husbandry.

Prior to embodiments of the disclosed invention, animal training required significant manual dexterity of a person and administering a reward when certain behaviors are observed. For instance, when training a canine, the handler must maintain small treats in a bag or pocket, a noise making device, and the canine's leash, all of which must be administered and orchestrated precisely to encourage the behaviors. Embodiments of the disclosed invention solve this problem.

SUMMARY

An animal training device is configured to encourage an animal with a clicking sound and a gelatinous reward toward certain desirable behaviors. The animal training device comprises a housing joined to a housing end cap at a housing first end and a dispenser head at a housing second end. A dowel rod is arranged within the housing and through a dispensing lever. A push bar is arranged within the housing and joined to the dispensing lever with a drive plate and a first compressor spring. The push bar further comprises a push bar first end and a push bar second end; wherein the dispensing lever is arranged through a bottom portion of the housing. An end cap is arranged over the push bar second end. A tube is fit over the end cap. The tube accommodates the gelatinous reward. Depressing the dispensing lever moves the drive plate and thus the push bar. This pushes the gelatinous reward through the dispenser head. A clicker plate is arranged through a top portion of the housing opposite the dispensing lever and further comprising a clicker button. Depressing the clicker button creates the clicking sound to encourage the animal between food-based rewards from the gelatinous dispenser.

In some embodiments, the housing further comprises a first clamshell joined to a second clamshell, the housing end cap and the dispenser head. A lick plate can be joined to the dispensing tube, the first clamshell, and the second clamshell. A plurality of gelatinous reward openings can be arranged on the lick plate.

BRIEF DESCRIPTION OF THE FIGURES

The detailed description of some embodiments of the invention is made below with reference to the accompanying figures, wherein like numerals represent corresponding parts of the figures.

FIG. 4 shows a section view of one embodiment of the present invention taken along line 4-4 in FIG. 2;

FIG. 5 shows a section view of one embodiment of the present invention showing clicker and reward delivery;

DETAILED DESCRIPTION OF CERTAIN EMBODIMENTS

Figure 1:
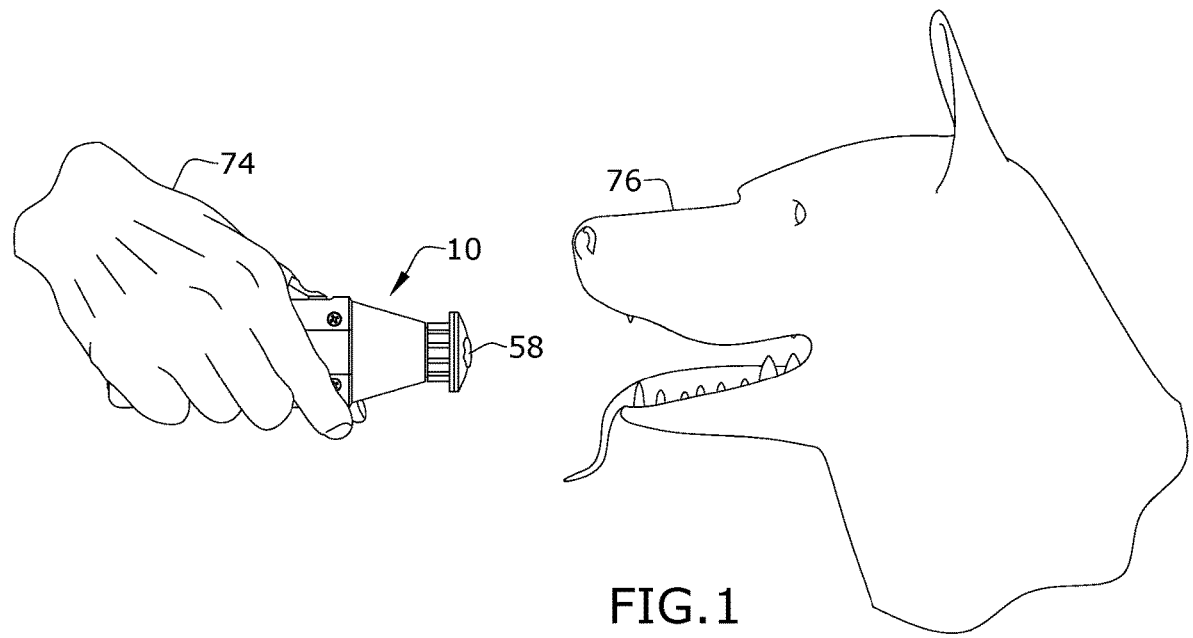
FIG. 1 shows a perspective view of one embodiment of the present invention shown in use.
Figure 2:
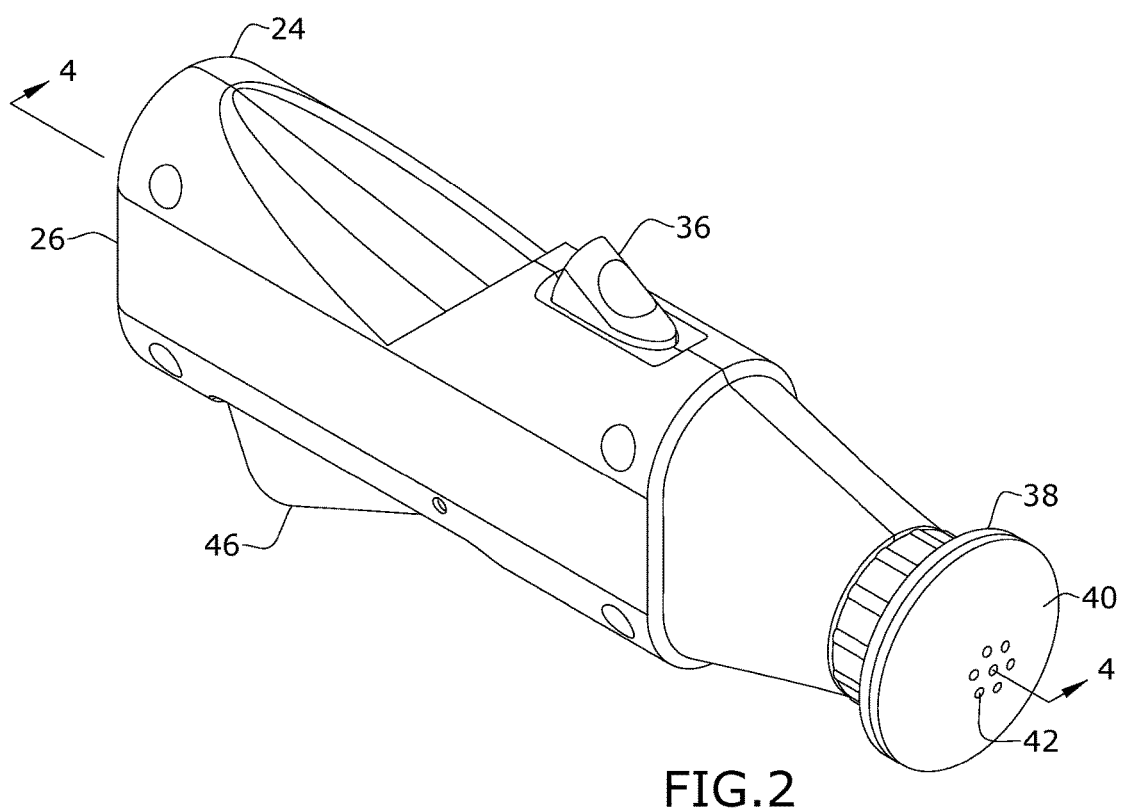
FIG. 2 shows a perspective view of one embodiment of the present.
Figure 3:
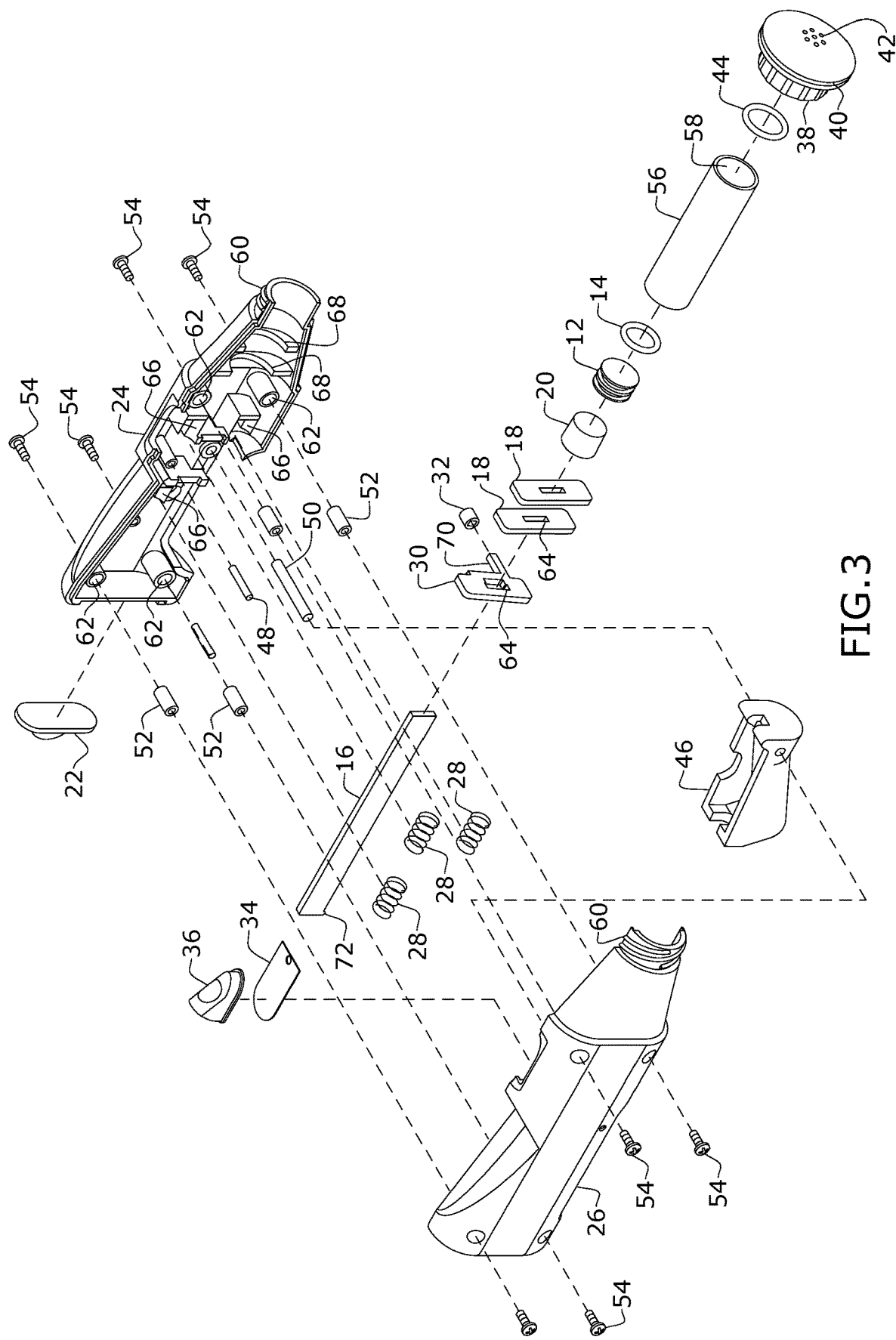
FIG. 3 shows an exploded view of one embodiment of the present.
Figure 6:
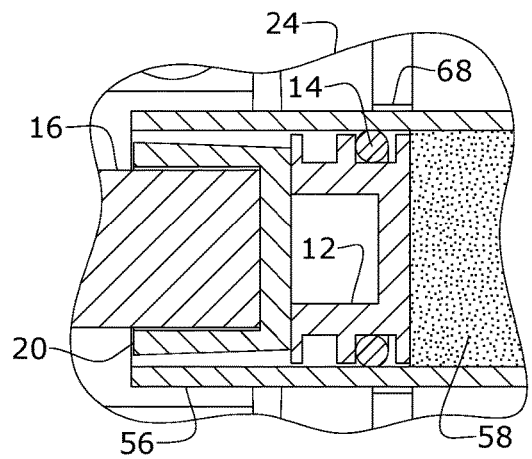
FIG. 6 shows an enlarged detail view of one embodiment of the present invention of the plunger.
Figure 7:
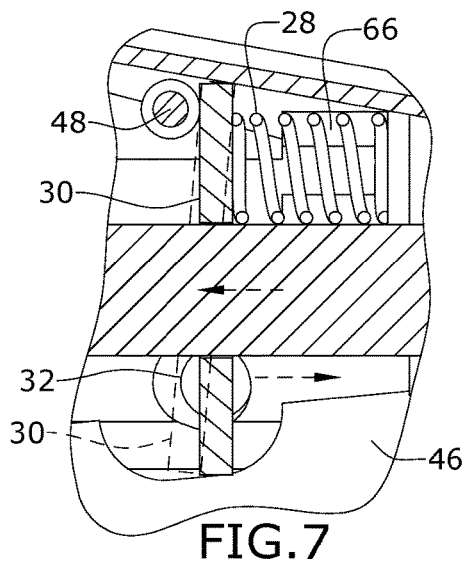
FIG. 7 shows an enlarged detail view of one embodiment of the present invention of the drive plate.
Figure 8:
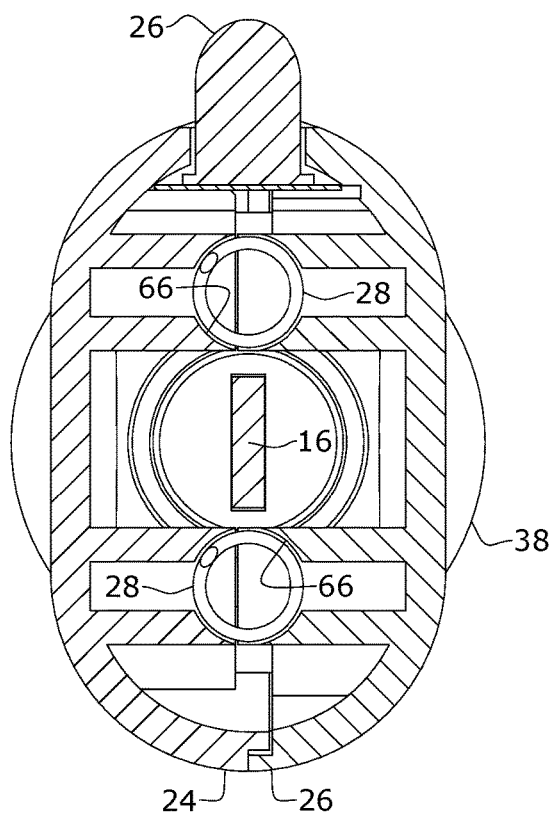
FIG. 8 shows a section view of one embodiment of the present invention taken along line 8-8 in FIG. 4.
Figure 9:
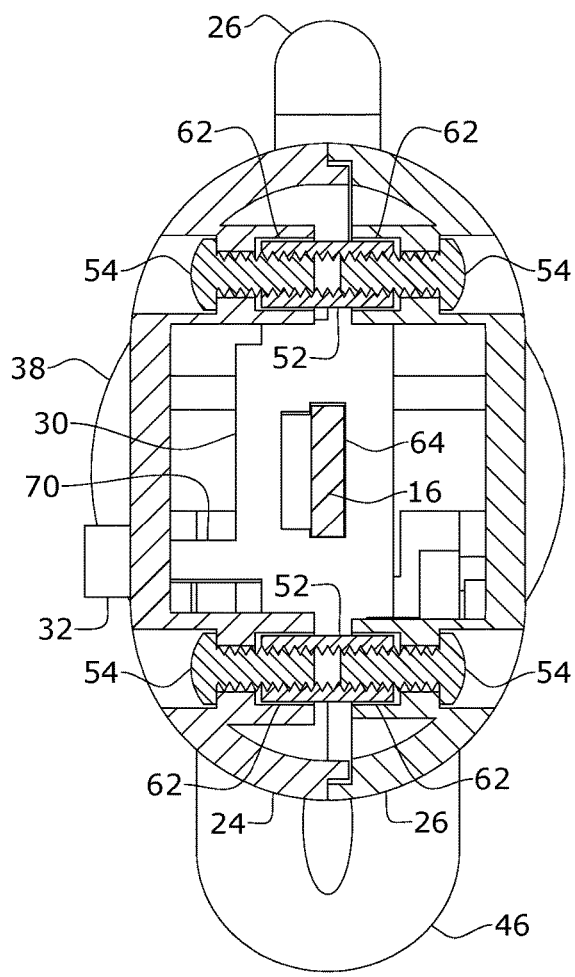
FIG. 9 shows a section view of one embodiment of the present invention taken along line 9-9 in FIG. 4.

By way of example, and referring to FIG. 1, one embodiment of an animal training device 10 further comprises a push bar 16 having a push bar first end and a push bar second end. The push bar first end further comprises a push bar stop 72.

A drive plate 30 further comprises a drive plate push bar opening 64 that accommodates the push bar 16 proximate the push bar second end. The drive plate 30 further comprises drive plate arm 70. A drive plate cap 32 fits over the drive plate arm 70. A first drive plate 18 further comprises a first drive plate push bar opening 64 that fits over the push bar 16. A second drive plate 18 further comprises a second drive plate push bar opening 64 that fits over the push bar 16.

A plunger 20 fits over the push bar second end. An end cap 12 is arranged immediately adjacent to the plunder 20, an end cap O-ring 14 is arranged in an end cap slot. A tube 56 fits over the end cap 14 and the end cap O-ring 14. The tube 56 is filled with a gelatinous reward 58.

A dispenser head 38 is held to the tube 56 with a dispenser cap O-ring 44. The dispenser head 38 further comprises a lick plate 40 further comprising a plurality of gelatinous reward openings 42.

A housing further comprises a first clamshell 24 joined to a second clamshell 26. The first clamshell 24 further comprises a first clamshell first standoff opening 62, a first clamshell second standoff opening 62, a first clamshell third standoff opening 62, and a first clamshell fourth standoff opening 62. A first clamshell first end is joined to a housing end cap 22. A first clamshell second end further comprises first clamshell dispenser head threads 60.

The first clamshell 24 further comprise a first clamshell first compressor spring saddle 66 which accommodates a first compressor spring 28. The first clamshell 24 further comprise a first clamshell second compressor spring saddle 66 which accommodates a second compressor spring 28. The first clamshell third compressor spring saddle 66 which accommodates a third compressor spring 28.

A dowel rod 50 is arranged into the first clamshell 24. The dowel rod 50 travels through a dispensing lever 46. The drive plate 30 is arranged against the dispensing lever and is supported against the first compressor spring 28. The second compressor spring 28 and the third compressor spring 28 are braced against the second drive plate 18. When a user 74 compresses the dispensing lever 46, the dispensing lever 46 moves the push bar 16 driving some of the gelatinous reward 58 through the plurality of gelatinous reward openings 42.

The first clamshell 24 has an opening that accommodates a clicker plate 34. The first clicker plate 34 is joined to a clicker button 36. When a user 74 pushes the clicker button 36, the clicker plate 34 produces a clicking sound useful in training an animal 76.

The second clamshell 24 further comprises a second clamshell first standoff opening 62, a second clamshell second standoff opening 62, a second clamshell third standoff opening 62, and a second clamshell fourth standoff opening 62. A second clamshell first end is joined to a housing end cap 22. A second clamshell second end further comprises second clamshell dispenser head threads 60.

A first threaded tube 52 is arranged between the first clamshell first standoff opening 62 the second clamshell first standoff opening 62. A first clamshell first standoff opening first threaded screw 54 and a second clamshell first standoff opening first threaded screw 54 are threaded into the first threaded tube 52 joining the first clamshell 24 to the second clamshell 24.

A second threaded tube 52 is arranged between the first clamshell second standoff opening 62 the second clamshell second standoff opening 62. A first clamshell second standoff opening first threaded screw 54 and a second clamshell second standoff opening first threaded screw 54 are threaded into the second threaded tube 52 joining the first clamshell 24 to the second clamshell 24.

A third threaded tube 52 is arranged between the first clamshell third standoff opening 62 the second clamshell third standoff opening 62. A first clamshell third standoff opening first threaded screw 54 and a second clamshell third standoff opening first threaded screw 54 are threaded into the third threaded tube 52 joining the first clamshell 24 to the second clamshell 24.

A fourth threaded tube 52 is arranged between the first clamshell fourth standoff opening 62 the second clamshell fourth standoff opening 62. A first clamshell fourth standoff opening first threaded screw 54 and a second clamshell fourth standoff opening first threaded screw 54 are threaded into the fourth threaded tube 52 joining the first clamshell 24 to the second clamshell 24.

In some embodiments, both clamshells have support ribs 68 for additional structural support and vibration dampening.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An animal training device, configured to encourage an animal with a clicking sound and a gelatinous reward; the animal training device comprising:
    a housing, joined to a housing end cap at a housing first end and a dispenser head at a housing second end;
    a dowel rod, arranged within the housing and through a dispensing lever;
    a push bar, arranged within the housing and joined to the dispensing lever with a drive plate and a first compressor spring; wherein the push bar further comprises a push bar first end and a push bar second end; wherein the dispensing lever is arranged through a bottom portion of the housing;
    an end cap, arranged over the push bar second end;
    a tube, fit over the end cap, wherein the tube accommodates the gelatinous reward; wherein depressing the dispensing lever moves the drive plate and thus the push bar, pushing the gelatinous reward through the dispenser head;
    a clicker plate, arranged through a top portion of the housing opposite the dispensing lever and further comprising a clicker button; wherein depressing the clicker button creates the clicking sound to encourage the animal.

2. The animal training device of claim 1, wherein the housing further comprises a first clamshell joined to a second clamshell, the housing end cap and the dispenser head.

3. The animal training device of claim 2, further comprising a lick plate, joined to the dispensing tube, the first clamshell, and the second clamshell.

4. The animal training device of claim 2, further comprising a plurality of gelatinous reward openings arranged on the lick plate.

* * * * *